United States Patent [19]

Yoshida et al.

[11] Patent Number: 5,252,356
[45] Date of Patent: Oct. 12, 1993

[54] METHOD OF PRODUCING TRANSPARENT ZINC OXIDE FILMS

[75] Inventors: Gohei Yoshida, Nara; Masao Kobayashi, Osaka, both of Japan

[73] Assignee: The Honjo Chemical Corporation, Osaka, Japan

[21] Appl. No.: 840,754

[22] Filed: Feb. 24, 1992

[30] Foreign Application Priority Data

Feb. 22, 1991 [JP] Japan .................................. 3-028237
Mar. 29, 1991 [JP] Japan .................................. 3-067178

[51] Int. Cl.$^5$ ........................... B05D 5/12; B05D 3/02
[52] U.S. Cl. ................................. 427/126.3; 427/108; 427/110; 427/168; 427/226; 427/419.3
[58] Field of Search ............. 427/226, 419.3, 126.3, 427/165, 108, 110, 168, 169; 65/60.52; 428/432

[56] References Cited

U.S. PATENT DOCUMENTS

| | | |
|---|---|---|
| 3,415,677 | 12/1968 | Moser et al. .................. 117/124 |
| 4,160,061 | 7/1979 | Okino et al. .................. 427/226 |
| 4,977,013 | 12/1990 | Ritchie et al. .................. 428/428 |

FOREIGN PATENT DOCUMENTS 2233594  1/1973  Fed. Rep. of Germany .
84898    4/1985  Luxembourg .
1397741  6/1975  United Kingdom .

OTHER PUBLICATIONS

Jean, J., "Preparation of Zinc Oxide Films by the Thermal Decomposition of Metallo-Organic Compounds", Journal of Material Science Letters, 9 (1990) 127–129.

*Primary Examiner*—Shrive Beck
*Assistant Examiner*—David M. Maiorana
*Attorney, Agent, or Firm*—Wenderoth, Lind & Ponack

[57] ABSTRACT

There is disclosed a method of producing a transparent zinc oxide film having an even thickness especially useful as a ultraviolet rays cut off. The method comprises applying a solution of an organic zinc compound selected from the group consisting of a zinc salt of a fatty acid of 3–7 carbons and a chelate compound of a diketone of 5–8 carbons in an organic solution on a substrate, and then baking the resultant coating at temperatures of 300°–600° C. It is preferred that the solution of an organic zinc compound further contains at least one organometallic compound of a metal selected from the group consisting of aluminum, indium, tin and titanium.

10 Claims, 4 Drawing Sheets

METHOD OF PRODUCING TRANSPARENT ZINC OXIDE FILMS

This invention relates to a method of producing a zinc oxide film which has a high transparence and an even thickness, especially useful as a ultraviolet rays cut off or interceptor. The invention further relates to a method of producing a composite film containing a transparent zinc oxide film which has electroconductivity as well as a high transparence and an even thickness, useful as a ultraviolet rays cut off or interceptor and many other uses.

The transparent film composed of zinc oxide exhibits a very sharp ultraviolet rays cut off, or intercepts or absorbs ultraviolet rays very effectively, and thus it is in wide use in such appliances as fluorescent lights, high luminance lamps and display panels of various office automation appliances as ultraviolet rays cut off. The film effectively prevents deterioration of fluorescent materials or liquid crystals incorporated therein or, eliminates or reduces harmful influence upon the eyes or skin.

The film also attracts much attention as a material for surface-treatment of glass used in hothouses or biochemical apparatus from the biochemical standpoint as technology in the field of ecology and biology progresses.

Various methods are already known for the production of such transparent zinc oxide films, among which is a baking method (J. Material Science Letters, 9 (1990), 127). According to the method, a solution of zinc 2-ethyl hexanoate in butanol is applied to a substrate and the resultant coating is baked to form a zinc oxide film. This method is inexpensive and has a high productivity. However, the method has been found to fail to provide transparent zinc oxide films having an even thickness since the resultant coatings shrink when being heated.

It is, therefore, an object of the invention to provide a method of producing a zinc oxide film which has a high transparence and an even thickness, and which is optionally electroconductive, especially useful as ultraviolet rays cut off.

Other and further objects, features and advantages of the invention will be apparent from the following description taken in connection with the accompanying drawings in which.

Figure 3:
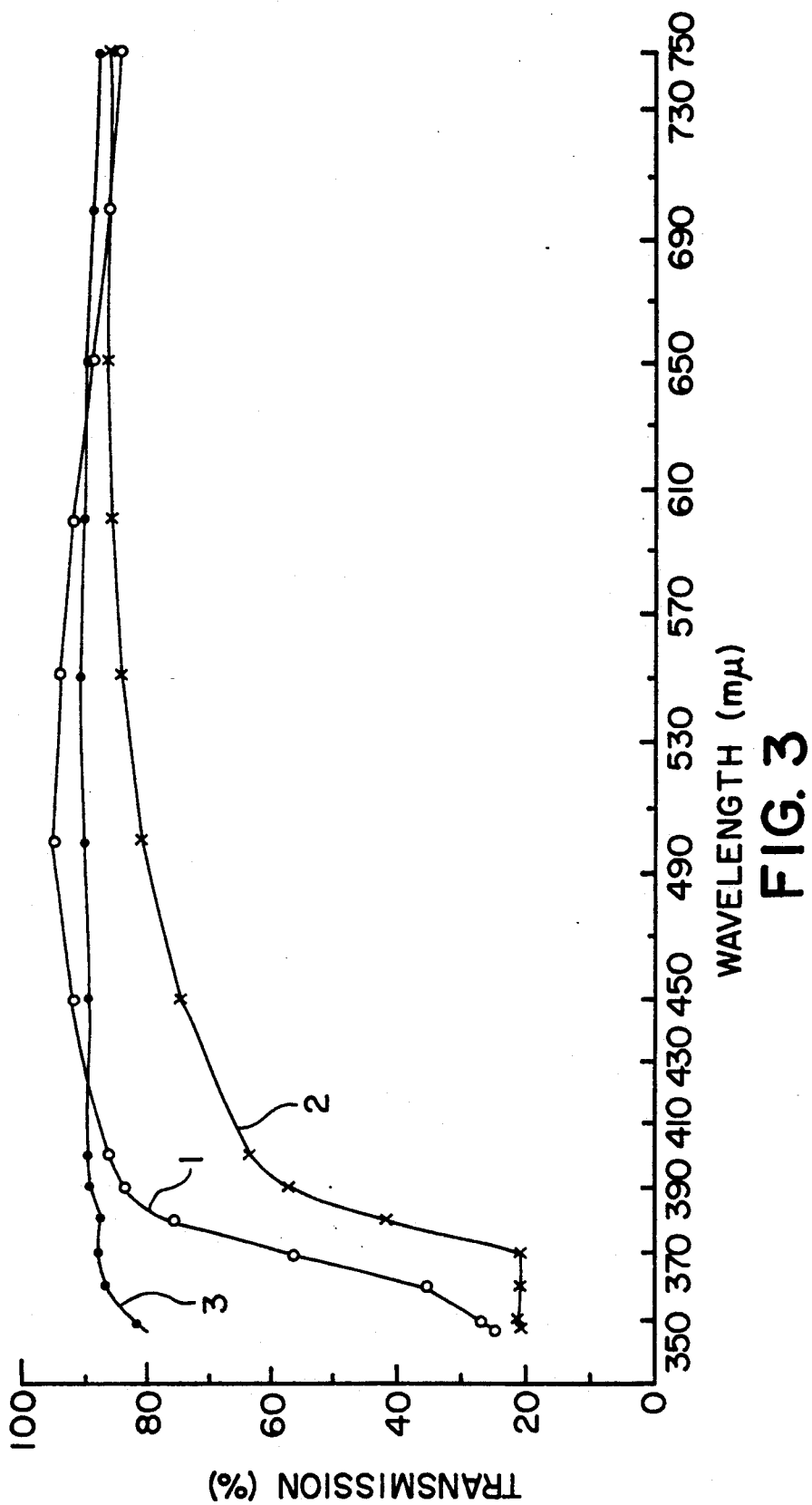
Figure 4:
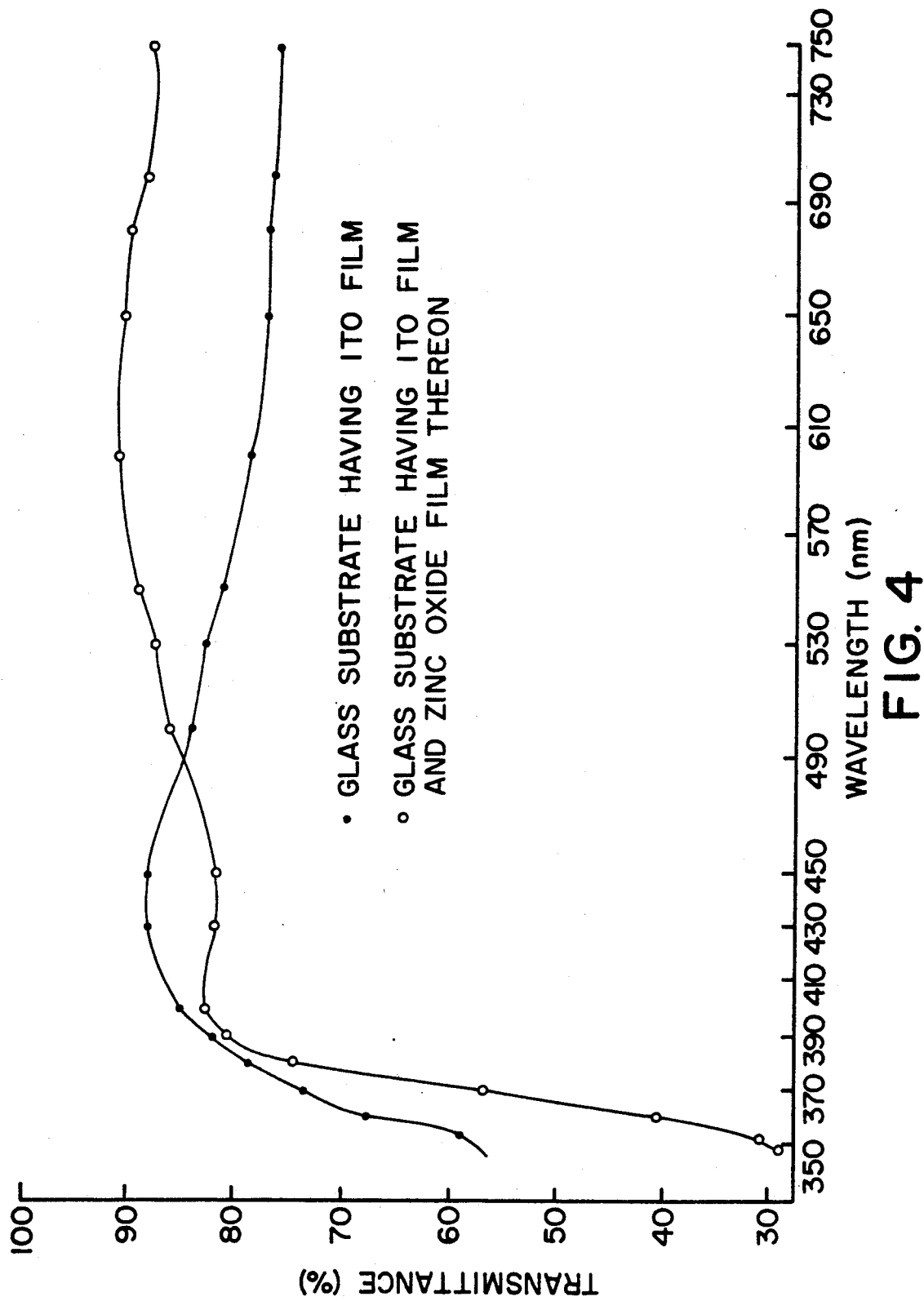

FIG. 3 shows the transparence of a glass substrate having a zinc oxide film thereon prepared by using a solution of organic zinc compound containing a titanium tetrabutoxide therein according to the invention, in comparison with the transparence of a glass substrate having a zinc oxide film thereon by using a solution of organic zinc compound containing no titanium tetrabutoxide therein, and the transparence of the glass substrate itself, each over a wavelength of 350-700 mμ; and FIG. 4 shows the transparence of a glass substrate having an indium (III) oxide-stannic oxide film and a transparent zinc oxide film thereon according to the invention, in comparison with the transparence of a glass substrate having an indium (III) oxide-stannic oxide film only thereon, each over a wavelength of 350-700 mμ.

According to the invention, there is provided a method of producing a transparent zinc oxide film, which comprises applying a solution of an organic zinc compound selected from the group consisting of a zinc salt of a fatty acid of 3-7 carbons and a chelate compound of a diketone of 5-8 carbons in an organic solvent on a substrate, and then baking the resultant coating at temperatures of 300°-600° C.

The organic zinc compound used in the invention is selected from the group consisting of a zinc salt of a fatty acid of 3-7 carbons and a chelate compound of a diketone of 5-8 carbons. By way of example, zinc valerate or zinc caproate is preferably used as the fatty acid salt, while zinc acetylacetonate as the chelate compound.

To prepare an organic solution of these organic zinc compounds, it is generally preferred that an organic solvent having relatively high boiling points is used. Thus, there may be preferably used n-butanol, dimethyl formamide, acetylacetone or ethyl cellosolve, although not limited to these exemplified.

The solution contains the organic zinc compound preferably in an amount of not less than 1% by weight, more preferably in the range of 2-20% by weight, and most preferably in the range of 3-15% by weight, based on the solution.

In accordance with the invention, it is further preferred that the solution of organic zinc compound contains at least one organometallic compound of a metal selected from the group consisting of aluminum, indium, tin and titanium, thereby to provide zinc oxide films having a higher transparence.

Preferred organometallic compounds include, for example, a salt of a fatty acid of up to 20 carbons, preferably of 6-18 carbons, an acetylacetone type complex of an α, β-unsaturated diketone, preferably of 5-7 carbons, or an alkoxide of an aliphatic alcohol of 3-5 carbons. Accordingly, the fatty acid salt includes, for example, aluminum laurate, indium 2-ethyl hexanoate and tin 2-ethyl hexanoate; the acetylacetone type complex includes, for example, aluminum acetylacetonate; and the alkoxide includes, for example, titanium tetrabutoxide. The organometallic compound is used in an amount of 1-50% by weight of the orgaic zinc compound.

According to the invention, there is further provided a method of producing a transparent and electroconductive film of zinc oxide, which comprises forming an electroconductive film of stannic oxide on a substrate, and then forming a transparent film of zinc oxide thereon.

It is preferred that the zinc oxide film is formed by the method as hereinbefore set forth, however, the zinc oxide film may be formed by any known conventional method, among which is a thermal decomposition method wherein an aqueous solution of zinc acetate is sprayed on a preheated substrate having a stannic oxide film thereon and is then thermally decomposed thereon to zinc oxide.

According to the method, when a pattern of electroconductive stannic oxide film is first formed as an undercoat on a limited area on a substrate, and then a transparent zinc oxide film is formed on the entire surface of the substrate, there is obtained such a transparent zinc oxide film which is electroconductive only on the stannic oxide film, with the other surface being insulative. Namely, the zinc oxide film has the same pattern on the substrate as the stannic oxide film with respect to electroconductivity. Moreover, the resultant layered or composite film composed of stannic oxide and zinc oxide intercepts ultraviolet rays effectively. It is also more transparent than the stannic oxide film.

According to the invention, an electroconductive indium (III) oxide-stannic oxide film (hereinafter referred to the ITO film, as accepted in the art) may be formed in place of an electroconductive film of stannic oxide.

The ITO film may be formed on a substrate by any known conventional method such as a sputtering method or an ion plating method. The transparent zinc oxide film formed on the ITO film is electroconductive. In addition, the substrate having the composite film has a higher transmittance to visible lights since the zinc oxide film has a smaller refractive index than the ITO film. The substrate is also useful as a ultraviolet rays cut off.

Further according to the invention, an electroconductive zinc oxide film may be prepared by first forming an insulative film of stannic oxide on a substrate, and then a transparent zinc oxide film thereon in the same manner as hereinbefore set forth, although the electroconductivity of the film being of a much smaller level.

As above set forth, the method of the invention provides zinc oxide films which have a high transparence and an even thickness, and which is optionally electroconductive, and the films are especially useful as ultraviolet rays cut off.

The invention will now be described in more detail with reference to examples, however, the invention is not limited to the examples.

EXAMPLE 1

A solution of 10 parts by weight of zinc valerate and 90 parts by weight of acetylacetone was applied on a glass substrate. The resultant coating was dried at room temperatures for 30 minutes, at a temperature of 110° C. for 30 minutes, and then baked at 550° C. for 30 minutes to provide a transparent zinc oxide film.

Figure 1:
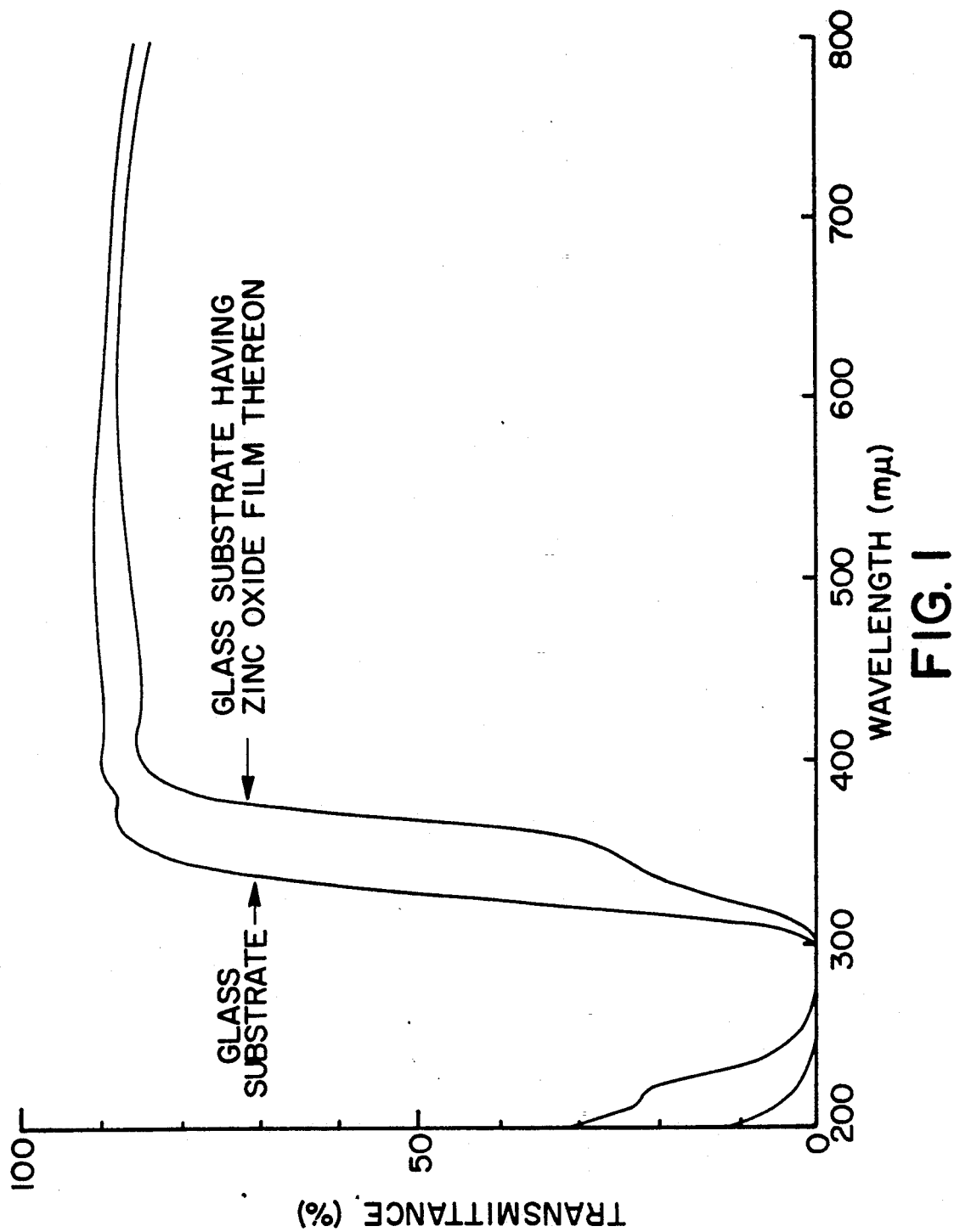
FIG. 1 shows the transmittance of a glass substrate having a transparent zinc oxide film thereon prepared according to the invention, in comparison with the glass substrate itself.

As shown in FIG. 1, the glass substrate having the transparent zinc oxide film thereon is a sharper ultraviolet rays cut off than the glass substrate itself.

EXAMPLE 2

A solution of 5 parts by weight of zinc caproate and 95 parts by weight of n-butanol was applied on a glass substrate. The resultant coating was dried and baked in the same manner as in Example 1 to provide a transparent zinc oxide film which was also found to be useful as a ultraviolet rays cut off.

EXAMPLE 3

A solution of 5 parts by weight of zinc acetylacetonate, 47.5 parts by weight of acetylacetone and 47.5 parts by weight of ethyl acetate was applied on a glass substrate. The resultant coating was dried and baked in the same manner as in Example 1 to provide a transparent zinc oxide film which was also found to be useful as a ultraviolet rays cut off.

EXAMPLE 4

An electroconductive film of stannic oxide having an area of 10 cm × 10 cm and an average surface resistivity of about 600 $\Omega/\square$ was formed on a glass substrate.

The substrate was immersed in a solution of 10 parts by weight of zinc valerate in 90 parts by weight of acetylacetone and then baked at 520° C. over one hour to provide a transparent zinc oxide film which was found to have an average surface resistivity of about 900 $\Omega/\square$.

EXAMPLE 5

A patterned electroconductive stannic oxide film having an average surface resistivity of about 600 $\Omega/\square$ was formed as an undercoat at a limited area on a glass substrate with the use of a mask pattern, and then a transparent zinc oxide film was formed on the entire surface of the substrate in the same manner as in Example 4.

The portion of the zinc oxide film having no undercoat of electroconductive stannic oxide film was found to be insulative, but the portion of the zinc oxide film having an undercoat of electroconductive stannic oxide film was found to have the same electroconductivity as the stannic oxide film.

EXAMPLE 6

An insulative stannic oxide film having an area of 10 cm × 10 cm and an indifinite surface resistivity was formed on a glass substrate, and then a transparent zinc oxide film was formed in the same manner as in Example 4.

The zinc oxide film was found to have an average surface resistivity of about 400 K$\Omega/\square$.

COMPARATIVE EXAMPLE 1

A glass substrate having an area of 10 cm × 10 cm was half immersed in the same solution of zinc valerate as in Example 4, and then baked at 520° C. for 30 minutes to provide a transparent zinc oxide film on the half of the substrate. Thereafter an electroconductive stannic oxide film having a surface resistivity of the order of $10^3$ $\Omega/\square$ was formed on the entire surface of the substrate by a CVD method.

The stannic oxide film on the zinc oxide film was found to have a surface resistivity of the order of $10^6$ $\Omega/\square$, about 1000 times as much as the surface resistivity of the electroconductive film on the other half of the substrate, on account of autodoping of zinc into the stannic oxide film.

EXAMPLE 7

An electroconductive stannic oxide film having an area of 10 cm × 10 cm and an average surface resistivity of about 600 $\Omega/\square$ was formed on a glass substrate.

The substrate was immersed in a solution of 5 parts by weight of zinc valerate and 1 part by weigh of titanium tetrabutoxide in 94 parts by weight of acetylacetone and then baked at 520° C. over one hour to provide an electroconductive and transparent zinc oxide film which was found to have an average surface resistivity of about 900 $\Omega/\square$.

Figure 2:
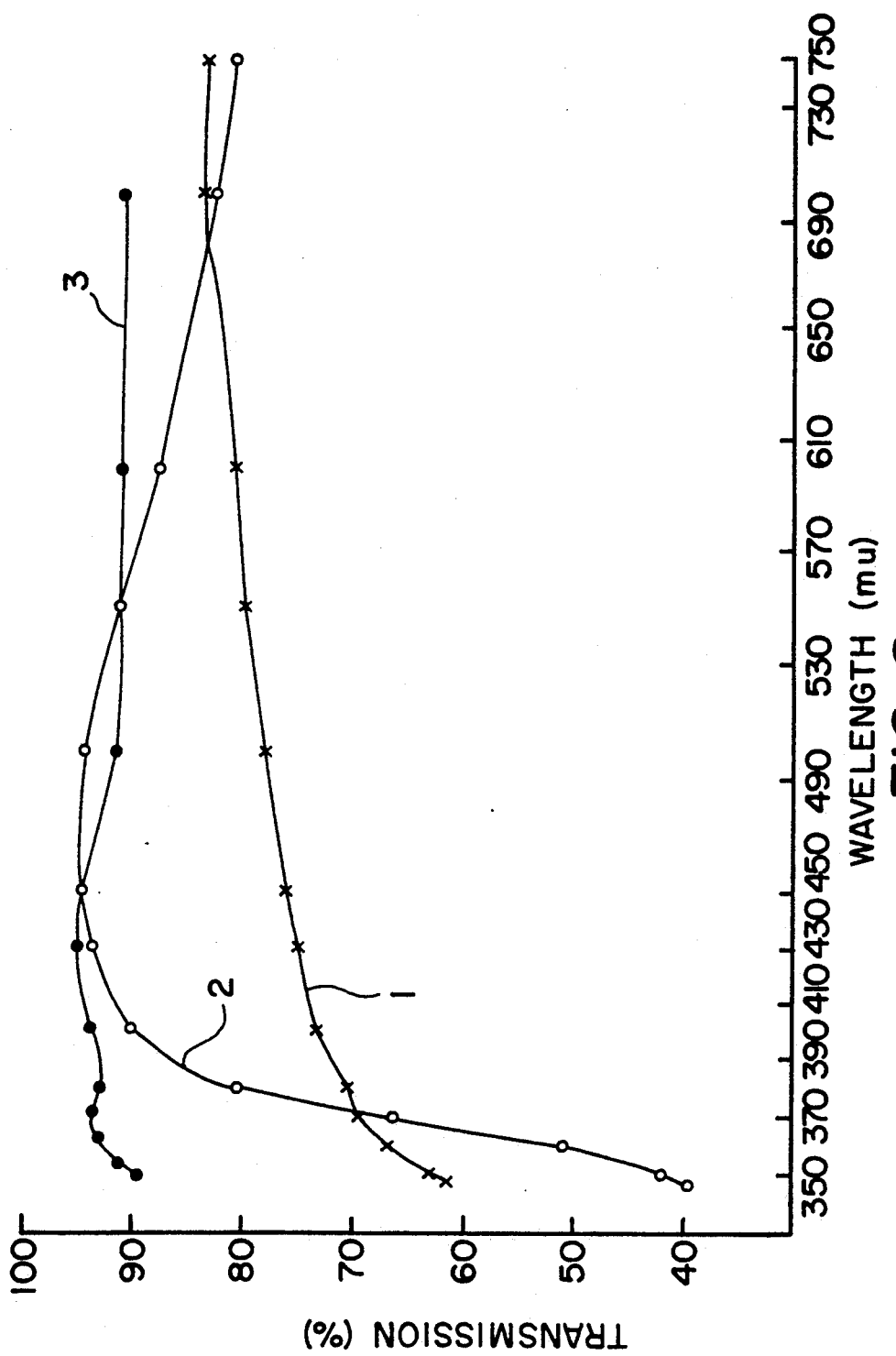
FIG. 2 shows the transparence of a glass substrate having an electroconductive stannic oxide film and zinc oxide film formed thereon according to the invention, in comparison with the transparence of a glass substrate having only an electroconductive stannic oxide film thereon, and the glass substrate itself, each over a wavelength of 350-700 mμ.

FIG. 2 shows the transparence of glass substrate having an electroconductive stannic oxide film thereon designated by 1, the transparence of glass substrate having an electroconductive stannic oxide film and zinc oxide film thereon according to the invention designated by 2, and the glass substrate designated by 3, each over a wavelength of 350-700 mμ. The substrate having the composite film of the invention is larger than the substrate 1 in transparence over a wavelength more than about 370 mμ, but also it is much more interceptive against ultraviolet rays over a wave length of not more than about 380 mμ.

EXAMPLE 8

A solution of 5 parts by weight of zinc valerate and 1 part by weight of titanium tetrabutoxide in 94 parts by weight of acetylacetone was applied on a glass substrate and then baked at 520° C. over one hour to provide a first transparent zinc oxide film.

A further solution of 5 parts by weight of zinc valerate in 95 parts by weight of acetylacetone was applied on a glass substrate and then baked at 520° over one hour to provide a second transparent zinc oxide film.

FIG. 3 shows the transparence of glass substrate having the first zinc oxide film thereon designated by 1, in comparison with the transparence of glass substrate having the second zinc oxide film thereon designated by 2, and of the glass substrate itself designated by 3, each over a wavelength of 350-700 mμ.

The substrate having the first film thereon is larger in transparence than the substrate over a wavelength more than 430 mμ, but also it is more interceptive against ultraviolet rays than the substrate itself 3.

In contrast, the substrate having the second film thereon has an uneven thickness so that the substrate is smaller in transparence over a wavelength of 350-700 mμ than the substrate itself.

EXAMPLE 9

Aluminum acetylacetonate, indium 2-ethylhexanoate and tin 2-ethylhexanoate were used respectively as the organometallic compound in place of titanium tetrabutoxide, and otherwise in the same manner as in Example 7, transparent and elecroconductive films were prepared. These films were also found to have the same high level of electroconductivity and transparence as the film of Example 7.

EXAMPLE 10

A glass substrate having an ITO film formed thereon was immersed in a solution of 10 parts by weight of zinc valerate in 90 parts by weight of acetylacetone and then baked at 320° C. over 30 minutes to provide a transparent zinc oxide film on the ITO film. The zinc oxide film was found to have an average surface resistivity of 30 Ω/□.

The ITO film on the glass substrate was found to have a surface resistivity of 25 Ω/□, but was found to have a surface resisitivity of 65 Ω/□ after the baking. It is well known that when an ITO film is heated, its surface resistivity increases.

FIG. 4 shows the transparence of glass substrate having the composite film formed as above in comparison with the glass substrate having the ITO film only, each over a wavelength of 350-700 mμ. The glass substrate having the ITO film only has a reduced transmittance at a wavelength more than about 500 mμ. In contrast, the glass substrate having the composite film thereon has an increasing transmittance towards a longer wavelength. Moreover, the glass substrate of the invention intercepts ultraviolet rays more effectively at a wavelength less than about 400 mμ.

What is claimed is:

1. A method of producing a transparent zinc oxide film for use as an ultraviolet ray interceptor, which comprises applying a solution consisting essentially of a zinc salt of a fatty acid of 3-7 carbons and an organometallic compound of titanium in an organic solvent on a substrate, and then baking the resultant coating at temperatures of 300°-600° C.

2. The method as claimed in claim 1 wherein the zinc salt of a fatty acid is zinc valerate or zinc caproate.

3. The method as claimed in claim 1 wherein the organometallic compound is a salt of a fatty acid of up to 20 carbons, an acetylacetone type complex of an α, β-unsaturated diketone of 5-7 carbons, or an alkoxide of aliphatic alcohol of 3-5 carbons.

4. The method as claimed in claim 3 wherein the organometallic compound is titanium tetrabutoxide.

5. A method of producing a transparent and electroconductive film of zinc oxide on a substrate, which comprises forming an electroconductive film of stannic oxide or indium (III) stannic oxide film on a substrate, and then forming a film of zinc oxide thereon by applying a solution consisting essentially of a zinc salt of a fatty acid of 3-7 carbons and an organometallic compound of titanium in an organic solvent, and then baking the resultant coating at temperatures of 300°-600° C.

6. The method as claimed in claim 5 wherein the organometallic compound is a salt of a fatty acid of up to 20 carbons, an acetylacetone type complex of an α, β-unsaturated diketone of 5-7 carbons, or an alkoxides of aliphatic alcohol of 3-5 carbons.

7. The method as claimed in claim 5 wherein the organometallic compound is titanium tetrabutoxide.

8. A method of producing transparent and electroconductive film of zinc oxide on a substrate, which comprises forming an insulative film of stannic oxide on a substrate, and then forming a film of zinc oxide thereon by applying a solution consisting essentially of a zinc salt of a fatty acid of 3-7 carbons and an organometallic compound of titanium in an organic solvent, and then baking the resultant coating at temperatures of 300°-600° C.

9. The method as claimed in claim 8 wherein the organometallic compound is a salt of a fatty acid of up to 20 carbons, an acetylacetone type complex of an α, β-unsaturated diketone of 5-7 carbons, or an alkoxides of aliphatic alcohol of 3-5 carbons.

10. The method as claimed in claim 8 wherein the organometallic compound is titanium tetrabutoxide.

* * * * *